United States Patent [19]

Von Allwörden et al.

[11] Patent Number: 5,630,313
[45] Date of Patent: May 20, 1997

[54] GRASS CONDITIONING DEVICE

[75] Inventors: Wilhelm Von Allwörden, Oberstotzingen; Martin Häfele, Adelmannsfelden, both of Germany

[73] Assignee: Same S.p.A., Treviglio, Italy

[21] Appl. No.: 392,784

[22] PCT Filed: Aug. 30, 1993

[86] PCT No.: PCT/EP93/02347

§ 371 Date: Apr. 20, 1995

§ 102(e) Date: Apr. 20, 1995

[87] PCT Pub. No.: WO94/05147

PCT Pub. Date: Mar. 17, 1994

[30] Foreign Application Priority Data

Aug. 29, 1992 [DE] Germany ............... 42 28 857.6

[51] Int. Cl.⁶ ............................................. A01D 82/00
[52] U.S. Cl. ............................................. 56/16.4 B
[58] Field of Search ................... 56/16.4 B, 16.4 C, 56/16.4 R, DIG. 1

[56] References Cited

U.S. PATENT DOCUMENTS

| | | | |
|---|---|---|---|
| 4,035,992 | 7/1977 | Moosbrucker et al. | 56/1 |
| 4,445,313 | 5/1984 | Elliott et al. | 56/16.4 |
| 5,269,124 | 12/1993 | Barthel et al. | 56/16.4 B |

FOREIGN PATENT DOCUMENTS

| | | | |
|---|---|---|---|
| 590562 | 1/1924 | France. | |
| 3815771 | 11/1989 | Germany | 56/DIG. 1 |
| 41 32 759 A1 | 10/1991 | Germany. | |
| 0205206 | 5/1986 | Netherlands. | |

*Primary Examiner*—Terry Lee Melius
*Attorney, Agent, or Firm*—Hardaway Law Firm P.A.; Charles L. Schwab

[57] ABSTRACT

A grass conditioning device for a grass mowing machine which receives mown grass through an inlet, discharges the conditioned grass through an outlet, and consists of at least two rows of counter-rotating cylinders. The grass conditioning device is flat, compact and can be economically integrated in mass produced harvesters. For this purpose, several cylinders having substantially the same diameter form a first and at least a second row of cylinders. The cylinder rows are associated with each other, the first cylinder row can be driven separately from the cylinders of the other cylinder rows and the at least two cylinder rows have different peripheral speeds.

12 Claims, 5 Drawing Sheets

GRASS CONDITIONING DEVICE

TECHNICAL FIELD

This invention relates to a grass conditioning device, in particular built into a grass mowing machine.

BACKGROUND OF THE INVENTION

From German patent document DE 41 32 759, there is known a grass conditioning device in which a plurality of planetary cylinders are arranged about a central cylinder, the planetary cylinders having a substantially smaller diameter than the central cylinder. In a harvester (grass mowing machine), this arrangement disadvantageously requires space on account of its height, whereby, for example, an installation space provided for a drive motor of the harvester is restricted. Moreover, this design requires unequal cylinder sizes, whereby the production, and in particular the spare parts storage, of the various cylinders is complicated and cost-intensive.

OBJECTS AND SUMMARY OF THE INVENTION

It is an object of the invention to provide a grass conditioning device that is flat and compact and is economical, particularly in a mass production of harvesters.

The use of cylinders having substantially the same diameter has the advantage that the fabrication (in particular in a mass production) of the grass conditioning device is economical because many identical parts can be employed. It is likewise advantageous that these cylinders form a first and at least one further row of cylinders, the rows of cylinders being associated with each other so that the grass conditioning device according to the invention is flat and compact. The possibility therefore exists that further devices (such as for example a drive motor) of the grass mowing machine can be arranged above the grass conditioning device of compact construction. A separate driving of the cylinders of each row of cylinders has the advantage that arbitrary drive capabilities adaptable to the design circumstances can find use. Conceivable here are drives via belts, toothed belts, chains, hydraulic, hydrostatic or electrical drives, as well as the driving of individual cylinders. The selection of peripheral cylinder speeds unequal to one another for the at least two rows of cylinders has the advantage that the mown grass delivered is reliably conditioned (spliced, separated into fibers), so that the discharged grass mat, which arises from the conditioned grass, dries quickly. It is conceivable to arrange all the cylinders together or all the cylinders of each several row of cylinders axially parallel and to support them in side walls (frames) located at either end of the cylinders.

In development of the invention, the axes of the cylinders of one row of cylinders are fixedly supported and the axes of the cylinders of the other row of cylinders are at least partially variably (support point of the axes displaceably or, respectively, pivotably) supported. Variable supporting in relation to fixed supporting has the advantage that the clearance between the cylinders of the two rows of cylinders is variable and thus adjustable. An optimal degree of conditioning to the mown grass is realizable on the basis of this adjustability. A variation in the supporting is performable in terms of design by virtue of the fact that the axes of the cylinders of one row of cylinders are springingly supported or, respectively, are hydraulically displaceable.

In development of the invention, a variable supporting of all axes of the cylinders of one row of cylinders is provided in such fashion that the axes are arranged fixedly in a variably supported frame. This alternative design has the advantage that the axes of the cylinders of one row of cylinders are arranged in fixed positions in a frame, said frame being variably supported (e.g., by spring force or hydraulic force).

In a further development of the invention, the axes of the cylinders of at least one row of cylinders are individually variably supported. This design has the advantage that the variable supporting is individually adjustable and thus is adaptable to the conditioning process.

In a further development of the invention, the rows of cylinders are arranged relative to one another in such fashion that the spacing of the cylinders in the region of the inlet is larger than the spacing of the cylinders in the region of the outlet, the axes of the cylinders of each row of cylinders being arranged in one plane. This arrangement is likewise suitable for improving the degree of conditioning, particularly in combination with peripheral cylinder speeds unequal to one another for at least two rows of cylinders.

BRIEF DESCRIPTION OF THE DRAWINGS

The foregoing and further developments are described in what follows and are illustrated in the individual figures of the drawings, in which.

DETAILED DESCRIPTION OF THE DRAWINGS

Figure 1:
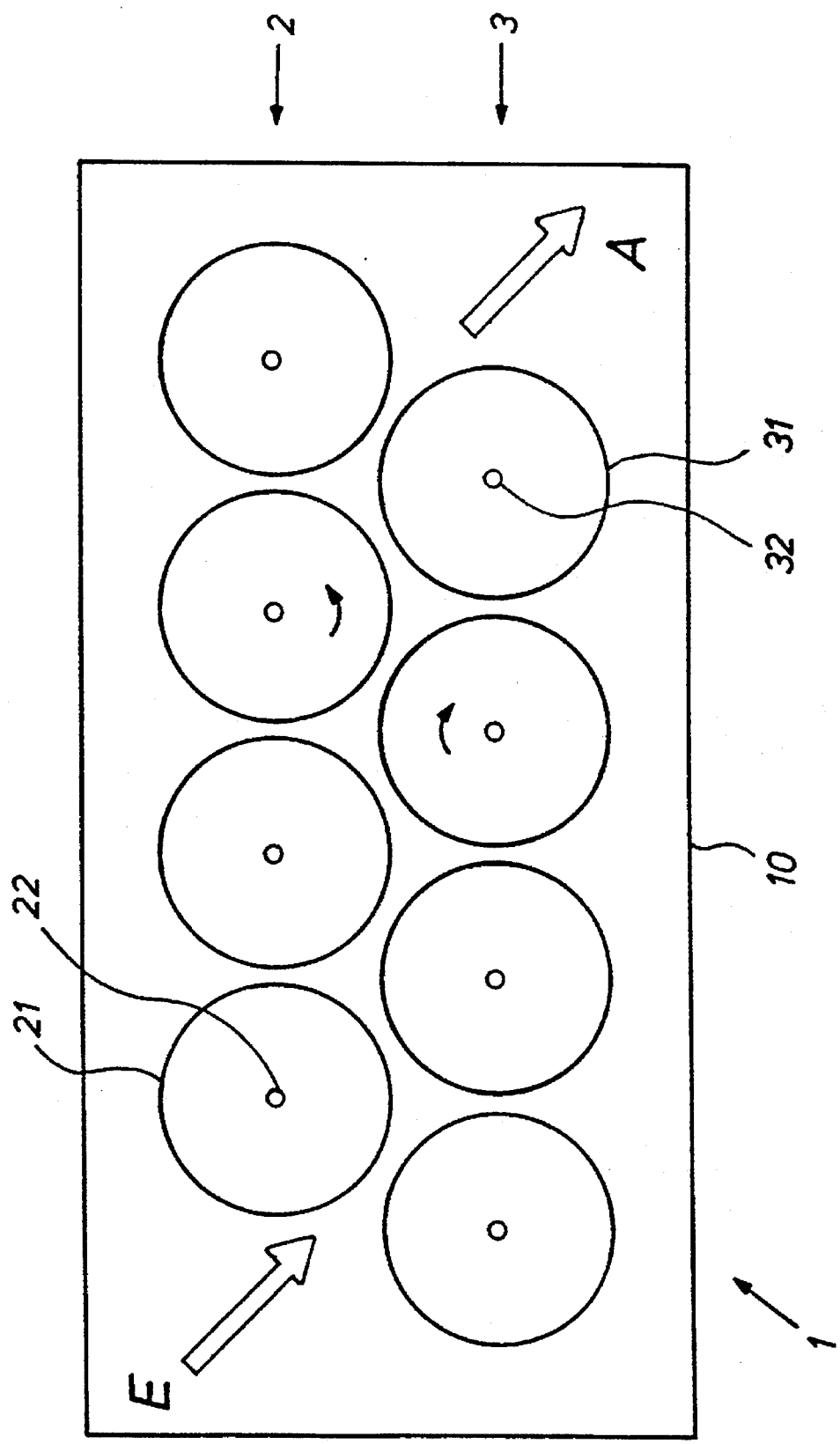
FIG. 1 shows a device according to the invention having two rows of cylinders.

FIG. 1 shows a device according to the invention having two rows of cylinders. A grass conditioning device 1 has a first row 2 of cylinders as well as a second row 3 of cylinders. The device 1 operates on the series roll principle. The device 1 is supplied with mown grass via an inlet E, while the conditioned grass leaves the device 1 via an outlet A. A plurality of cylinders 21 of the first row 2 of cylinders as well as a plurality of cylinders 31 of the second row 3 of cylinders are supported in a frame 10 of the grass conditioning device 1. The cylinders 21 and 31, respectively, are rotatably supported at their axially opposite ends in the frame 10 by shafts having axes 22 and 32, respectively. In this way, the axes 22, 32 of the cylinders 21 and 31 in this development of the invention are non-adjustable. The cylinders 21 or 31, respectively, have a contrary direction of rotation, the peripheral speed of cylinders of one row of cylinders being different from the peripheral speed of cylinders of the other row of cylinders. Alternatively to the development of the device 1 having two rows of cylinders, the use of at least one further device 1 is conceivable, so that two inlets and two outlets (next to one another or one above another) are present in order to increase the volume of grass to be conditioned. The grass conditioning device 1 shown in FIG. 1 has four cylinders 21 in cylinder row 2 and four cylinders 31 in cylinder row 3, the number of cylinders being based on the design circumstances. In an advantageous development, the number of the first row 2 is equal to the number of cylinders of the further row of cylinders 3, this not, however, being categorically necessary. Thus, the number of cylinders 21 of the first row 2 can be larger or smaller than the number of cylinders 31 of the further row 3. The rotation direction of the cylinders 21 and 31, respectively, is selected such that the grass delivered to the device 1 in the region of the inlet E is automatically drawn in and transported in the direction of the outlet A.

Figure 2:
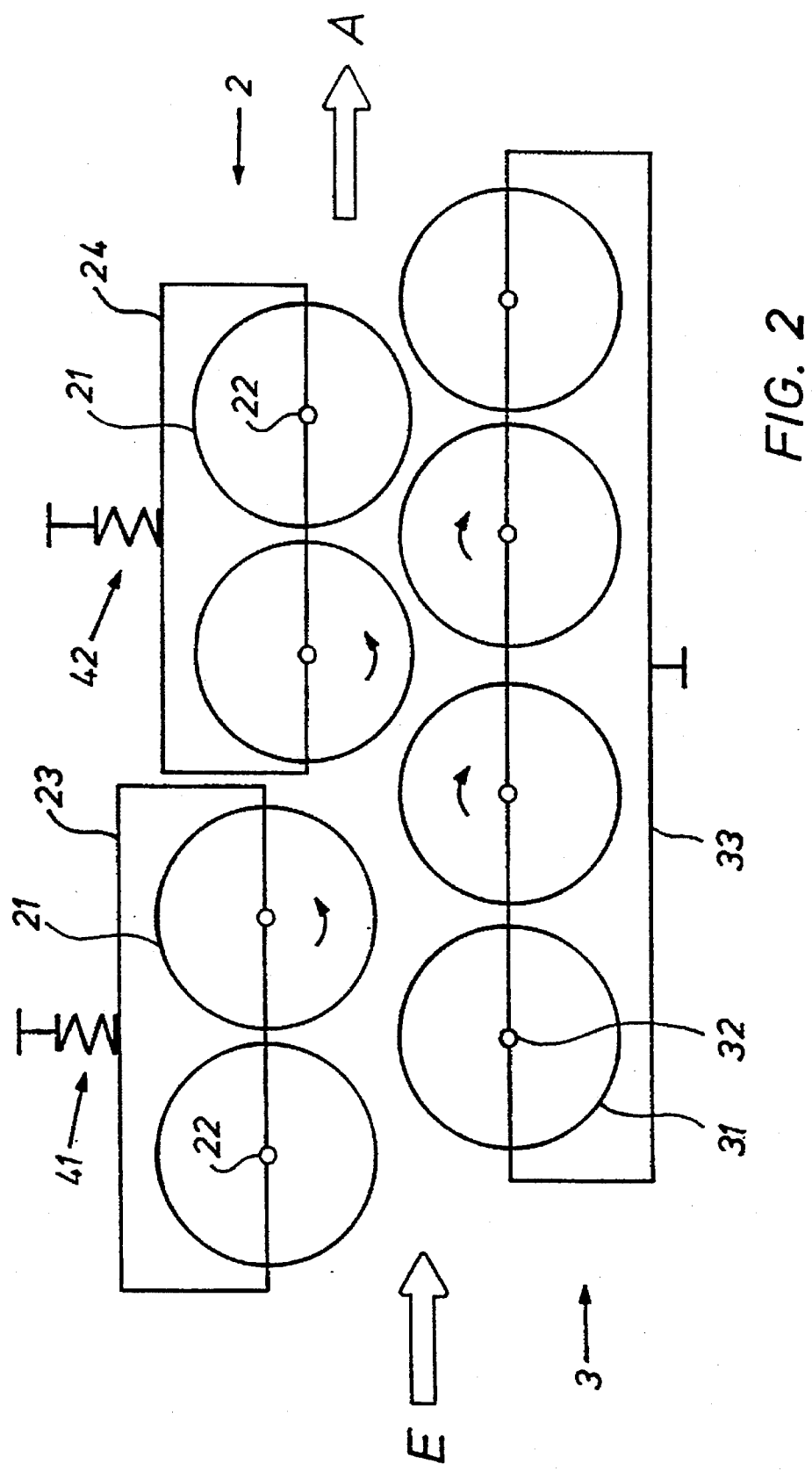
FIG. 2 shows a device according to the invention having fixedly and at least partially variably supported cylinders.

FIG. 2 shows a device according to the invention having some non-adjustable cylinders which rotate about fixed axes and some adjustably positioned cylinders whose axes are adjustable. Besides the components shown in FIG. 1 and provided with the same reference numbers, the cylinders 21 of the first row 2 are partially supported in rotationally fixed fashion in at least one frame 23 separated from the further row 3. In the development shown in FIG. 2, the first row 2 consists of a frame 23 and a frame 24, which accept the cylinders 21 in such fashion that the cylinders 21 arranged in the frame 23 are located a greater distance away from the cylinders 31 of the further row 3 than are the cylinders 21 arranged in the frame 24. This arrangement shown in FIG. 2 has the advantage that a stepwise conditioning of the delivered grass is possible. While the axes 32 of the cylinders 31 are fixed relative to a frame 33 of the further row 3, the axis 22 of at least some of the cylinders 21 of the first row 2 are adjustably supported in such fashion that the adjustment in position of the rollers can be performed manually, hydraulically, by electric motor means, or also in spring biased manner. Thus it is shown in FIG. 2 that the frames 23 and 24 are adjustably supported by springs 41 and 42 (for example in a guide not shown), the springs 41 and 42 bearing on a fixed end (for example a frame or a supporting structure of the grass mowing machine). It is conceivable to design the spring force of the two springs 41 and 42 equal or unequal, in particular in order to achieve unequal spacings of the cylinders away from one another (as shown in FIG. 2). The frame 33 likewise bears on a fixed end or, alternatively, itself represents a fixed end. With springing support, a simple protection against foreign bodies is afforded, the springing giving way as the foreign body passes through.

Figure 3:
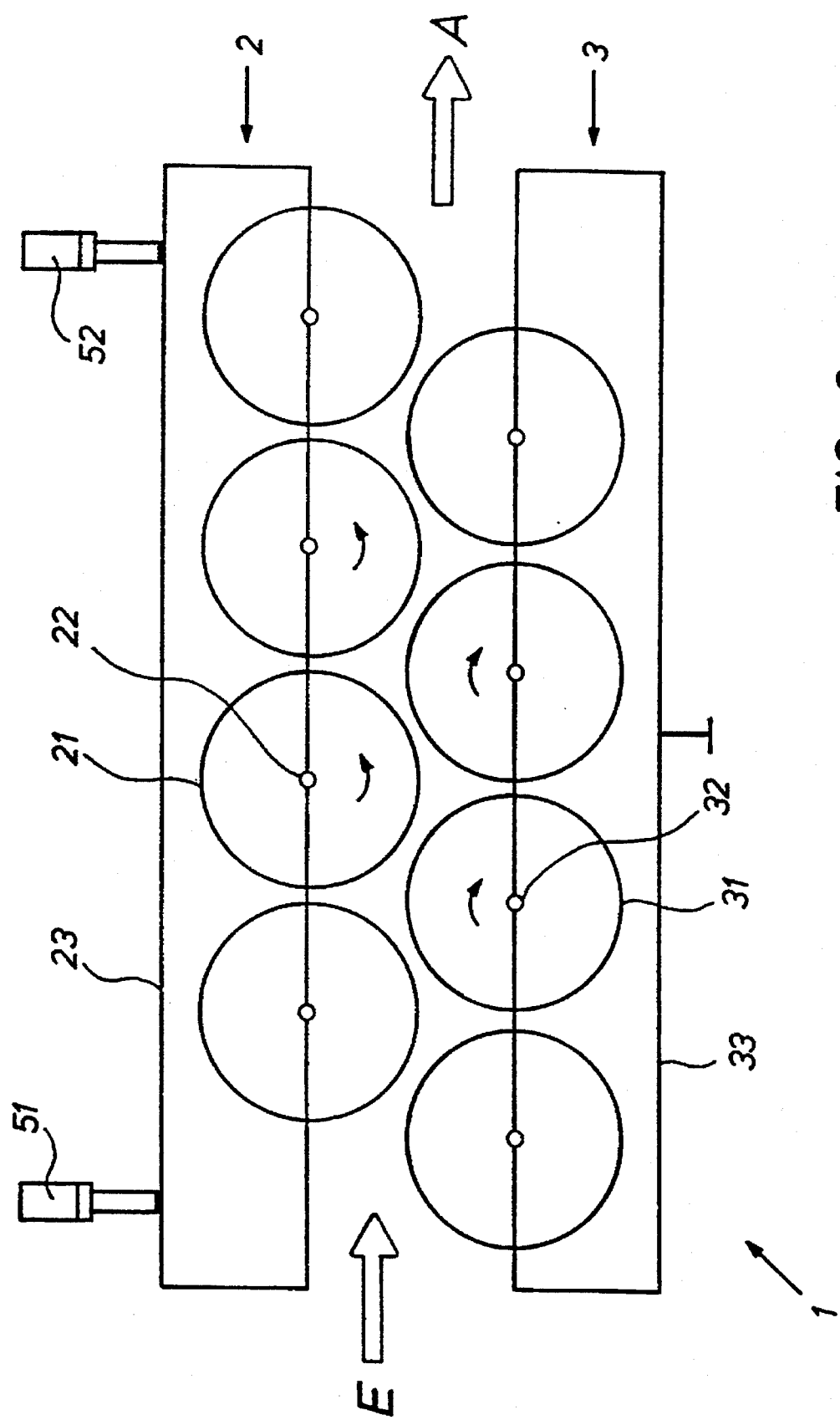
FIG. 3 shows a device according to the invention having cylinders arranged in a variably supported frame.

FIG. 3 shows a device according to the invention having cylinders arranged in an adjustably supported frame. The grass conditioning device 1 shown in FIG. 3 uses an adjustable frame 23 on which the cylinders 21 of cylinder row 2 are rotatably supported on axes 22 which are fixed relative to the frame 23. The adjustable supporting of the frame 23 and of the axes 22 is achieved by means of hydraulic cylinders 51 and 52, which are operable with an equal or, respectively, with an unequal hydraulic pressure. Alternatively to the design shown in FIG. 2, it is likewise conceivable that the first cylinder row 2 is non-adjustable and the further cylinder row 3 is adjustably supported. The frame 33 of the further row 3 is in turn fixed. Moreover, it is conceivable that the frame 33 is also adjustably supported (e.g., in order to achieve a damped suspension).

Figure 4:
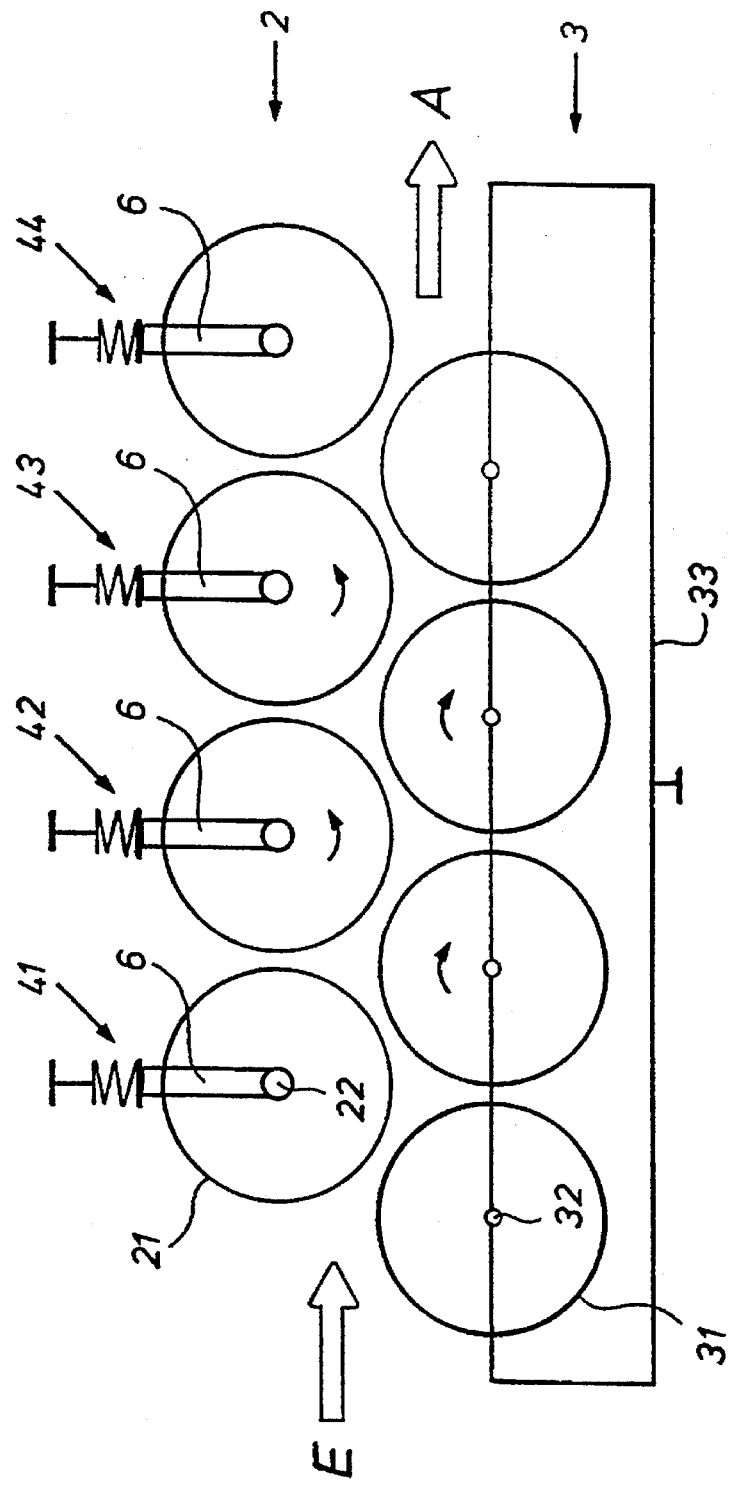
FIG. 4 and 4A show a device according to the invention having individually variably supported cylinders.
Figure 4A:
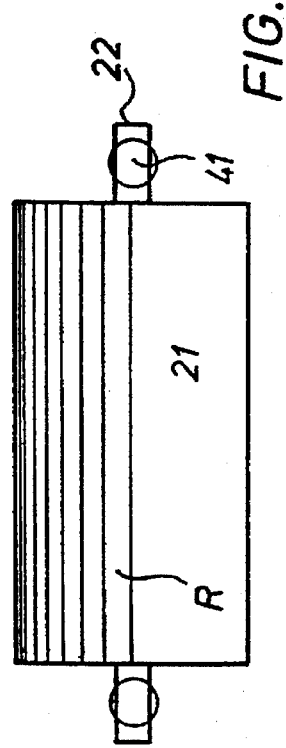

FIG. 4 shows a device according to the invention having individually adjustably supported cylinders. Besides the components shown in the foregoing Figures and provided with the same reference numbers, the cylinders 21 of the first row 2 are individually adjustably supported via guiding elements 6 and springs 41 to 44. Alternatively thereto, the individual adjustable supporting is performable by means of a manual adjustment (for example a spindle), hydraulically or also by electric motor means. In particular, the sprung individual suspension of the cylinders 21 (alternatively thereto, of the cylinders 31) has the advantage that unequal volumes of delivered grass are processable without interruption of the conditioning process. In FIG. 4a there is shown a cylinder 21 whose end part of the axes 22 is supported against the force of the spring (for example spring 41) as well as via the guiding element (6) not shown in this figure. Moreover, the cylinder 21 (and in particular all cylinders of the first row 2 as well as of the further row 3) exhibits grooving R, which in particular is arranged axially parallel to the axes 22 or 32, respectively, so that by this means an optimal conditioning process (separation into fibers) and a further transport of the delivered grass is insured. Moreover, further geometric structures (for example diamond shapes) are conceivable as surface pattern. The surface pattern can be made in the cylinders or affixed to them.

Figure 5:
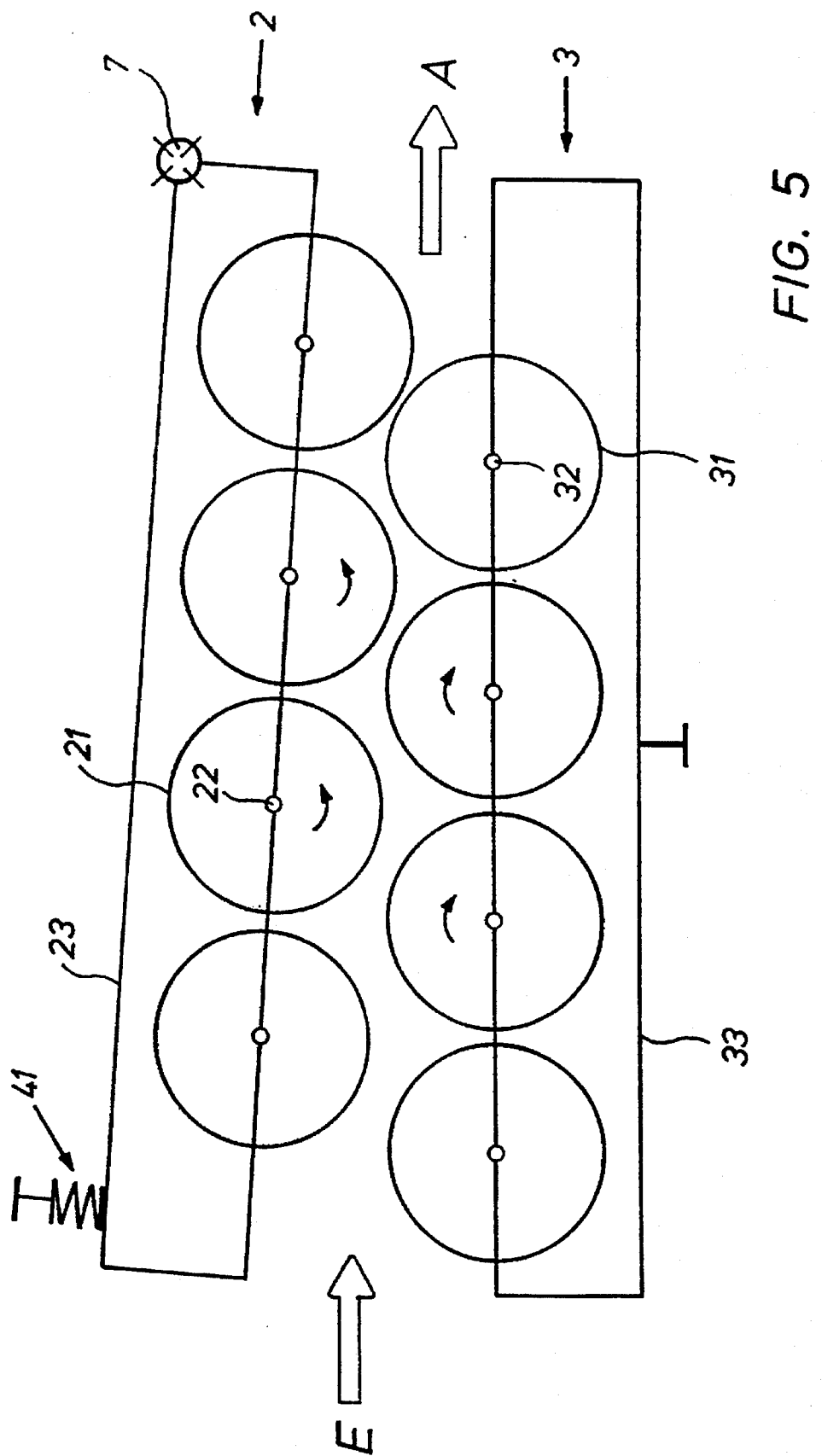
FIG. 5 shows a device according to the invention having a pivotably supported frame.

FIG. 5 shows a device according to the invention having a rotatably supported frame. The rows 2 or 3, respectively, shown in this FIG. 5 are arranged relative to one another in such fashion that the spacing of the cylinders 21, 31 in the region of the inlet E is larger than the spacing of the cylinders 21, 31 in the region of the outlet A, the axes 22 or 32, respectively, of the cylinders 21 or 31, respectively, of each of the cylinder rows 2 or 3, respectively, being arranged in one plane. In FIG. 5 it is shown that the frame 23 of the first row 2 is supported about an axis 7 and the spacing between the cylinders 21 and 31 in the region of the inlet E is held largely constant by means of the force of a spring 41. This design has the advantage that, first, the forces on the grass that passes through the device 1 increase from the region of the inlet E to the region of the outlet A and a gentle conditioning process is feasible. Second, it is possible, in case of a disturbance of the conditioning process (e.g., by means of contamination of the device 1 by means of foreign bodies), to pivot the frame 23 and remedy the disturbance. Alternatively to an axially parallel arrangement of the axis 7 to the axes 22, an arrangement of the axis 7 at a right angle to the axes 22 (or 32, respectively) is conceivable, so that the frame 32 is likewise pivotable (hinged) for the remedying of disturbances. Such an arrangement is conceivable in both the development of the invention shown in FIG. 5 and the arrangement shown in FIG. 2 and 3.

The rollers shown in the foregoing Figures are, according to the invention, at least partially individually and/or collectively driveable. This can be accomplished in suitable fashion by means of a chain, belt or toothed belt drive, by means of a hydraulic drive or by means of an electric motor drive. In a development of the invention, the cylinders of each row of cylinders are collectively driveable, a ratio of peripheral speeds between the cylinders of the first and of the further row of cylinders being provided in the range between 1:1.1 and 1:10 for the realization of an optimal conditioning process. It is likewise conceivable that the unequal peripheral speeds of the cylinders of the at least two rows of cylinders is adjustable in dependence on a cutting and feeding device placed ahead of the device 1 in the region of the inlet E, so that, depending on the volume of the delivered grass, an obstruction or, respectively, a no-load operation is largely avoidable. Likewise, for the optimization of the conditioning process, it is provided that the peripheral speed of the cylinders of the conditioning process, it is provided that the peripheral speed of the cylinders of at least one row of cylinders, beginning from the inlet E to the outlet A, is designed continuously increasing. This can be implemented, for example, by means of a suitable choice of the transmission ratio of the corresponding drive of the cylinders. It should be further pointed out that the spacing between the cylinders of the first row of cylinders and the cylinders of the further row of cylinders is constant or variable. In the case of a variable spacing, it is conceivable to permit variation over an entire range by means of the variation of the spring force (or, respectively, the hydraulics) or to split it into a range of a variable pre-adjustment and of the variation against the spring force. Likewise, it is conceivable to control or, respectively, to automate the spring force or, respectively, the hydraulic force, but also the pre-adjustment (for example manually by means of a spindle) in dependence on parameters of the harvesting process (for example volume of delivered grass) as well as in dependence on vehicle-specific parameters (for example speed).

What is claimed is:

1. A grass conditioning device for a grass mowing machine comprising:

an inlet for receiving mown grass;

an outlet for discharging conditioned grass;

a first row (2) of cylinders in juxtaposed relation to one another between said inlet and said outlet including at least two cylinders having axes lying in a first plane, a second row (3) of cylinders in juxtaposed relation to one another between said inlet and said outlet including at least two cylinders having axes lying in a second plane, said at least two cylinders of said second row (3) of cylinders being disposed below said at least two cylinders of said first row (2) of cylinders and said at least two cylinders of said first row of cylinders being driven separately from said at least two cylinders of said second row of cylinders in such a manner that the peripheral speed of said at least two cylinders (21) of said first row (2) is different than the peripheral speed of said at least two cylinders (31) of said second row (3).

2. The device of claim 1 wherein the axes (32) of said cylinders (31) of said second row (3) are non-adjustable relative to said device and wherein the axis (22) of at least one of said cylinders 21 of said first row (2) is adjustably supported in said device.

3. The device of claim 1 wherein one of said rows of cylinders are rotatably mounted on a frame on fixedly positioned axes and wherein said frame is adjustable relative to the other of said rows of cylinders.

4. The device of claim 1 wherein the axes of said cylinders of one of said first and second rows are individually adjustable.

5. The device of claim 1 wherein said cylinders of said first row (2) of cylinders are staggered in relation to said cylinders of said second row (3) of cylinders.

6. The device of claim 1 wherein said rows of cylinders are separately driven.

7. The device of claim 1 wherein said peripheral speed of said cylinders is adjusted in dependence on the volume of grass fed into said inlet.

8. The device of claim 1 wherein the ratio of said peripheral speed of said cylinders of said first row and said peripheral speed of said cylinders of said second row is in the range of ratios between 1:1.1 and 1:10.

9. The device of claim 1 wherein said peripheral speed of said cylinders of one of said first and second rows is progressively greater from said inlet to said outlet.

10. A grass conditioning device for a grass mowing machine comprising:

an inlet for receiving mown grass;

an outlet for discharging conditioned grass;

first and second rows (2,3) of cylinders (21, 31), said rows being in juxtaposed relation to one another and being disposed between said inlet and said outlet, said cylinders of said first row being counter rotatable to said cylinders of said second row to condition said mown grass and convey said conditioned mown grass from said inlet to said outlet and, said first row of cylinders having axes lying in a first plane and said second row of cylinders having axes lying in a second plane and wherein the spacing between said cylinders of said first row and said cylinders of said second row is greater at said inlet than at said outlet.

11. The device of claim 10 wherein said cylinders of said first row of cylinders are staggered in relation to said cylinders of said second row of cylinders.

12. The device of claim 10 wherein said first and second rows of cylinders are mounted on separate frames and wherein at least one of said frames is movable relative to the other of said frames to adjust the spacing of the cylinders of one of said first and second rows relative to the cylinders of the other of said first and second rows.

* * * * *